(12) United States Patent
Diez et al.

(10) Patent No.: US 12,188,217 B2
(45) Date of Patent: Jan. 7, 2025

(54) MODULAR GRID

(71) Applicant: SOLENO INC., St-Jean-sur-Richelieu (CA)

(72) Inventors: Carl Diez, Longueuil (CA); Richard Poirier, Ste-Madeleine (CA)

(73) Assignee: SOLENO INC., Ste-Madeleine (CA)

( * ) Notice: Subject to any disclaimer, the term of this patent is extended or adjusted under 35 U.S.C. 154(b) by 119 days.

(21) Appl. No.: 17/963,650

(22) Filed: Oct. 11, 2022

(65) Prior Publication Data
US 2024/0117619 A1 Apr. 11, 2024

(51) Int. Cl.
*E03F 5/04* (2006.01)
*E03F 3/04* (2006.01)
*F16L 19/02* (2006.01)

(52) U.S. Cl.
CPC ............ *E03F 3/04* (2013.01); *F16L 19/0218* (2013.01)

(58) Field of Classification Search
CPC . A01M 29/30; E01F 5/005; E03F 5/06; E03F 7/06; E02B 13/02; F16L 19/0218
See application file for complete search history.

(56) References Cited

U.S. PATENT DOCUMENTS

| | | | | |
|---|---|---|---|---|
| 2,859,875 | A * | 11/1958 | Wilkie | E03F 5/06 210/163 |
| 3,587,239 | A * | 6/1971 | Feland | E01F 5/005 405/125 |
| 5,037,542 | A * | 8/1991 | Carroll | E01F 5/005 210/170.03 |
| 5,618,416 | A * | 4/1997 | Haefner | E04D 13/0409 210/166 |
| 7,685,778 | B2 * | 3/2010 | Edell | E04D 13/08 52/12 |
| 7,695,216 | B2 * | 4/2010 | Kincheloe | E03F 1/00 405/125 |
| 8,459,298 | B1 * | 6/2013 | Valdez | E03F 7/06 137/315.16 |
| 8,496,405 | B1 * | 7/2013 | Kincheloe | E03F 5/0404 405/125 |
| 10,392,765 | B1 * | 8/2019 | Hohnbaum | E03F 7/06 |
| 11,008,748 | B1 * | 5/2021 | Hodge, Jr. | E03F 5/06 |
| 2002/0153049 | A1 * | 10/2002 | Brown | E04D 13/08 138/109 |
| 2007/0154266 | A1 * | 7/2007 | Wassman | E01F 5/005 405/125 |
| 2012/0036631 | A1 * | 2/2012 | Cook | E03F 5/0408 4/679 |
| 2013/0315670 | A1 * | 11/2013 | Haire | E02B 13/02 405/125 |

(Continued)

*Primary Examiner* — Benjamin F Fiorello
(74) *Attorney, Agent, or Firm* — BCF LLP (57) ABSTRACT

A modular grid comprises a faceplate having at least one front opening and at least two tabs on its periphery, a sleeve configured to abut on the faceplate, and at least two attachments, each attachment being configured for insertion into an opening formed in a corresponding one of the at least two tabs and into a corresponding opening formed on the perimeter of the sleeve. The modular grid may be mounted on an extremity of a conduit, whether at its inlet or outlet side, and be shaped for mating with the extremity of the conduit. A perimeter of the faceplate may be circular, square, oval, rectangular, triangular, pentagonal, hexagonal, or octagonal.

18 Claims, 10 Drawing Sheets

(56) References Cited

U.S. PATENT DOCUMENTS

| | | | |
|---|---|---|---|
| 2014/0166560 A1* | 6/2014 | Cohen | E03F 5/06 |
| | | | 210/164 |
| 2016/0040820 A1* | 2/2016 | Morris | F15D 1/04 |
| | | | 138/89 |
| 2016/0090727 A1* | 3/2016 | Elliott | E03F 7/00 |
| | | | 285/42 |
| 2018/0016792 A1* | 1/2018 | Valdez | F16L 37/02 |
| 2018/0363285 A1* | 12/2018 | Robinson | E03F 3/046 |
| 2019/0257069 A1* | 8/2019 | Lopez, Jr. | E03F 7/06 |
| 2023/0081504 A1* | 3/2023 | Ciepluch | E03F 5/06 |
| | | | 210/163 |

* cited by examiner

MODULAR GRID

FIELD

The present technology relates to the field of wastewater conduits. More specifically but not exclusively, the present technology is concerned with a modular grid mountable on the end of a conduit.

BACKGROUND

Grids are commonly mounted at the end of wastewater conduits, such as those found for example in agricultural fields. Such grids may come in variable sizes and shapes, but are frequently fairly large, for example having 36-inch diameters or larger. For mounting at the end of a conduit, the grid usually includes a sheath extending from the face of the grid, the sheath being shaped for mating with the end of the conduit. In many applications, the conduits are tubular, in which case the sheaths are ring-shaped.

Many grids are constructed of stainless steel or galvanized steel, the sheath being welded to the face of the grid. However, using welding methods for constructing grids has several disadvantages. Firstly, welding steel components requires to employ trained manpower. Poor workmanship may lead weakening of the steel material, deformation of the steel material, oxidation of the steel material that may lose its rust resistance, creation of unsightly weld connections, and the like. It may be required to apply a galvanic coating process to the grid after the welding process. Although aluminum could be favorably used as a material for constructing grids, welding of aluminum is particularly difficult and requires great expertise. For all those reasons, the use of welding to construct grids is expensive and may provide less than ideal results.

Even though the recent developments identified above may provide benefits, improvements are still desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In an aspect, various implementations of the present technology provide a modular grid comprising a faceplate having at least one front opening and at least two tabs on its periphery, a sleeve configured to abut on the faceplate, and at least two attachments, each attachment being configured for insertion into an opening formed in a corresponding one of the at least two tabs and into a corresponding opening formed on the perimeter of the sleeve.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future.

In an aspect, the present technology, a modular grid is formed of a faceplate, a sleeve, and two or more attachments, for example screws, bolts and nuts, rivets, and the like. The faceplate includes at least one front opening and at least two tabs on its periphery. The sleeve has a perimeter configured for matching a perimeter, for example a circle, a square, a rectangle, and the like, of the faceplate. The modular grid is assembled by inserting each attachment into a corresponding tab of the faceplate and into a corresponding opening formed on the perimeter of the sleeve. The sleeve may be mounted on an outer face or on an inner face of a conduit having a matching perimeter. Usually, but without limitation, the modular grid will be assembled upon mounting on an extremity of a conduit, the attachments being at that time inserted in corresponding openings formed on the extremity of the conduit.

With these fundamentals in place, we will now consider some non-limiting examples to illustrate various implementations of aspects of the present technology.

Figure 1:
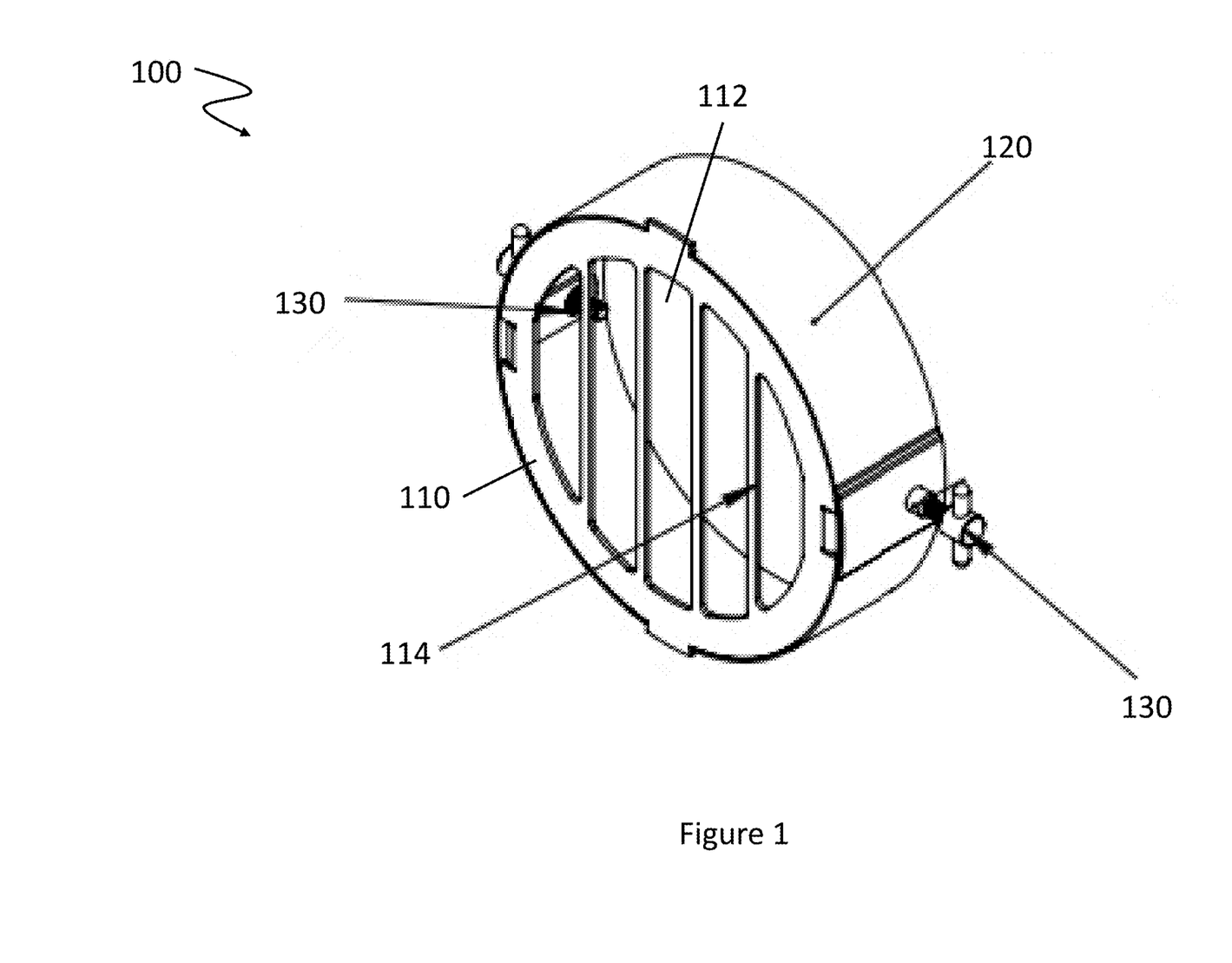
FIG. 1 is a perspective view taken from a front, right side of a modular grid in accordance with an embodiment of the present technology.
Figure 2:
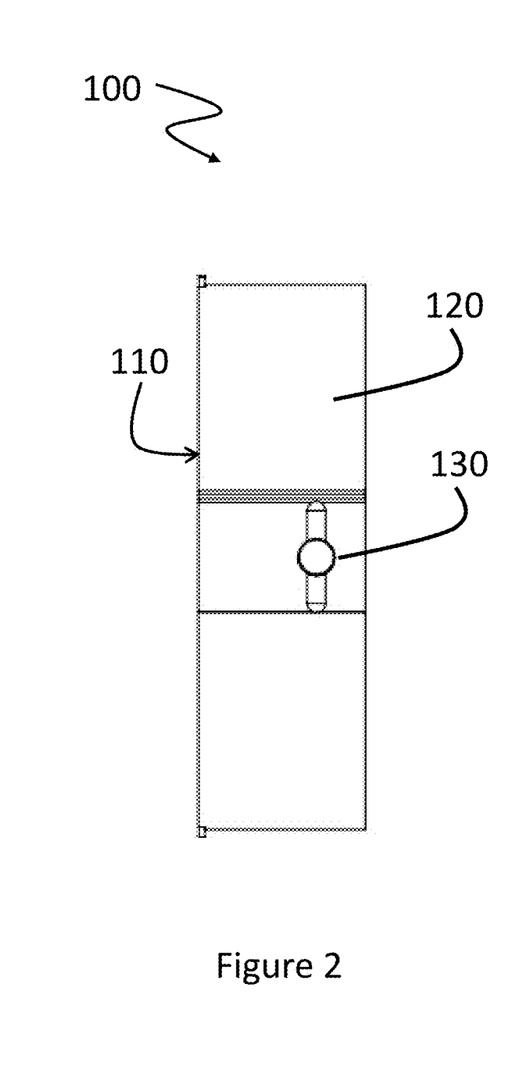
FIG. 2 is a right elevation view of the modular grid of FIG. 1 in accordance with an embodiment of the present technology.
Figure 3:
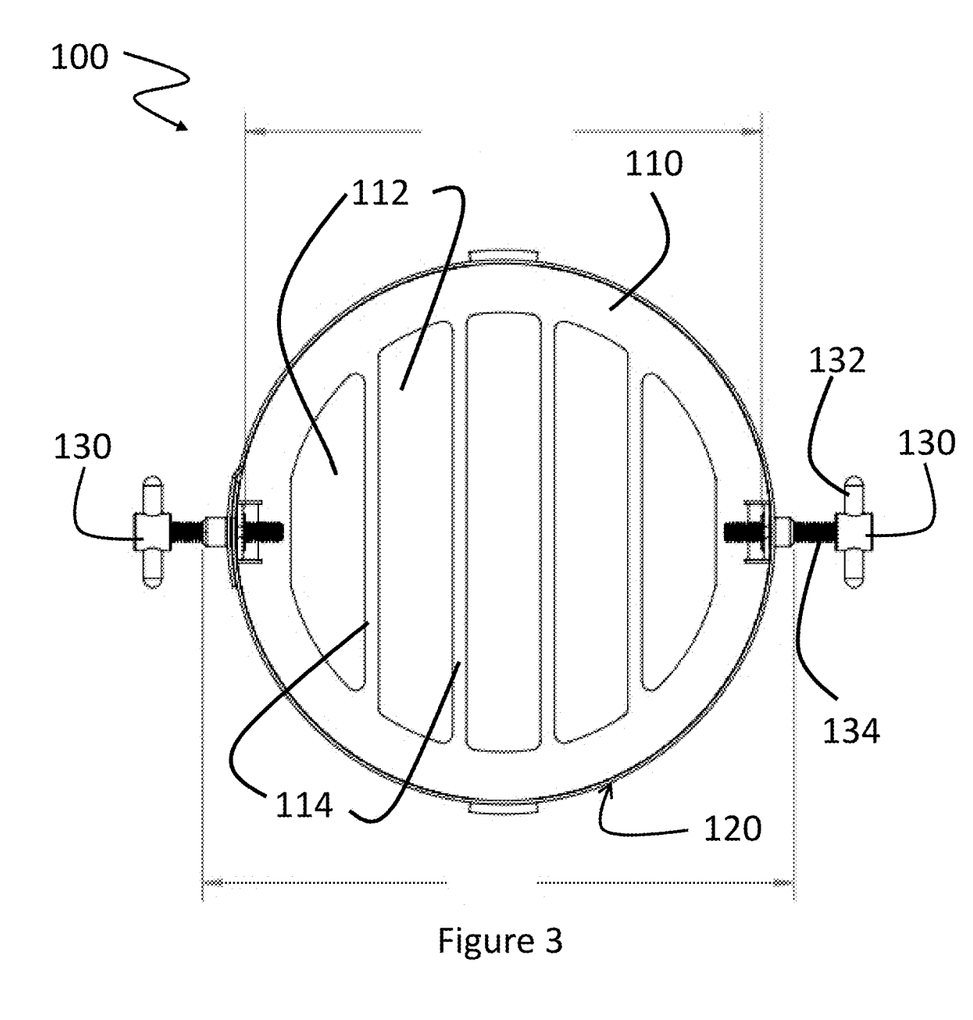
FIG. 3 is a rear elevation view of the modular grid of FIG. 1 in accordance with an embodiment of the present technology.

FIG. 1 is a perspective view taken from a front, right side of a modular grid 100. FIG. 2 is a right elevation view of the modular grid 100. FIG. 3 is a rear elevation view of the modular grid 100. As shown on FIGS. 1-3, the modular grid 100 comprises a faceplate 110 having a plurality of openings 112 defined between bars 114, a sleeve 120 abutting on the faceplate 110, and at least two attachments 130 (two are shown) connecting the sleeve 120 to the faceplate 110. The two attachments 130 are used to mount the modular grid 100 to a conduit (not shown).

Each of the faceplate 110 and the sleeve 120 may be made of galvanized steel, stainless steel, aluminum, polymer, and the like, and may for example be manufactured using a laser cutting process.

While the faceplate 110 and the sleeve 120 as illustrated in the drawings are circular in shape, their perimeters may be formed as circles, ovals, squares, rectangles, triangles, pentagons, hexagons and octagons. Generally speaking, the sleeve 120 will be shaped for mounting on a conduit on which the modular grid 100 is to be installed, being sized for installation on an inner face or on an outer face of the extremity of the conduit. The faceplate 110 will be shaped to provide a sufficient abutting surface for the sleeve 120. As illustrated, the perimeter of the sleeve 120 may substantially match the perimeter of the faceplate 110. In an embodiment, the perimeter of the faceplate 110 may extend beyond the perimeter defined by the sleeve 120. For example, aesthetic considerations of the modular grid 100 may cause the perimeter of the faceplate 110 to be larger than that of the sleeve 120. For example, the sleeve 120 may have a round or oval perimeter while the faceplate may have a square or rectangular perimeter. Respective sizes and shapes of the faceplate 110 and of the sleeve 120 may thus vary.

As illustrated, the faceplate 110 comprises a plurality of front openings 112 defined between a plurality of parallel bars 114 so that the front openings 112 form a plurality of parallel slots that collectively extend over a major portion of an area defined by the perimeter of the faceplate 110. In an embodiment, some bars may extend in a first direction and some other bars may extend in a second direction intersecting the first direction, so that the front openings form a rectangular grid. Defining on the faceplate 110 openings having other shapes, being for example oval, circular, or diamond-shaped, is also contemplated.

Figure 4:
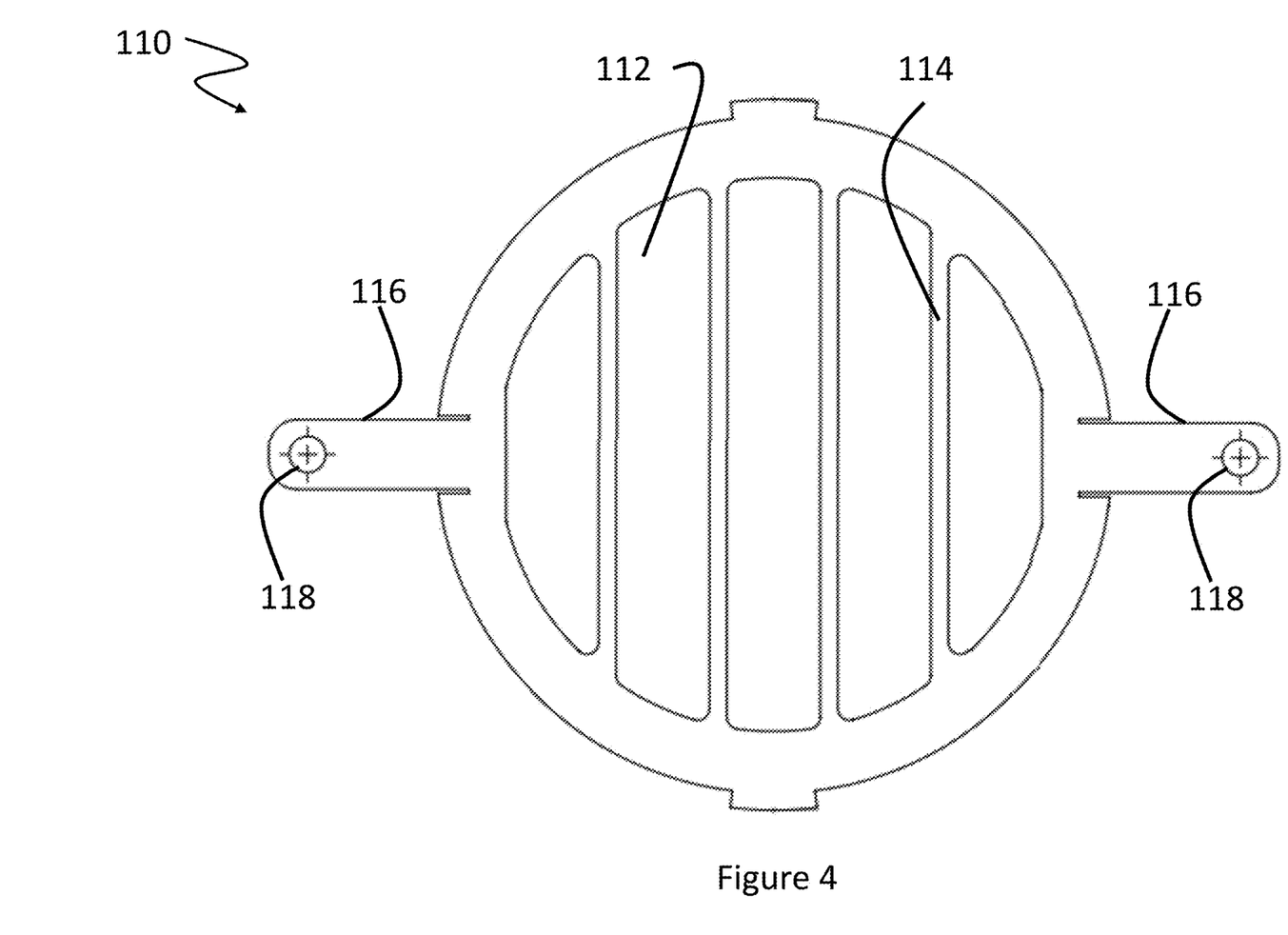
FIG. 4 is a front elevation view of a faceplate of the modular grid of FIG. 1 with unfolded tabs in accordance with an embodiment of the present technology.
Figure 5:
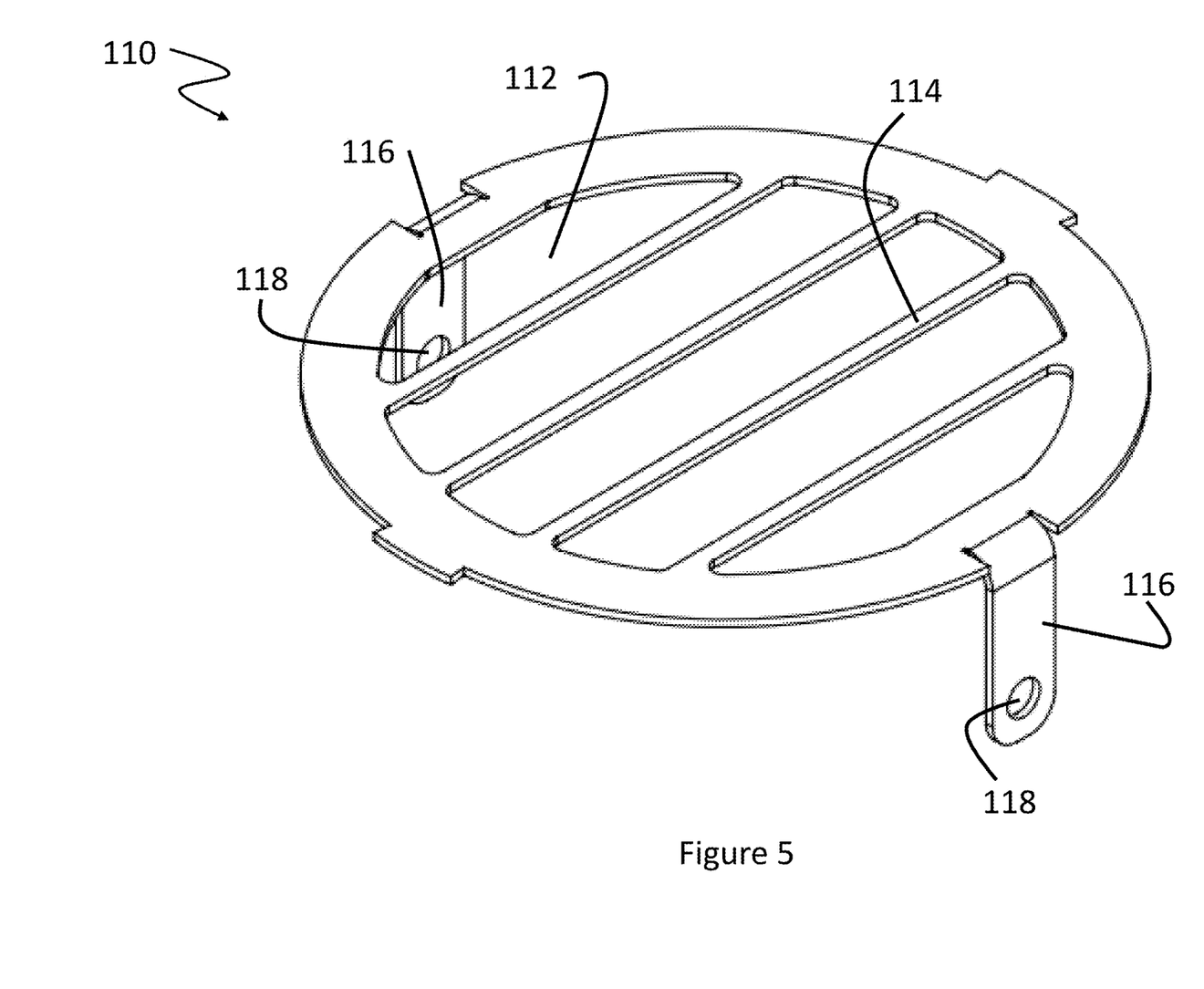
FIG. 5 is a perspective view taken from a front, right side of the faceplate of FIG. 4 with folded tabs in accordance with an embodiment of the present technology.

FIG. 4 is a front elevation view of a faceplate of the modular grid of FIG. 1 with unfolded tabs. FIG. 5 is a perspective view taken from a front, right side of the faceplate of FIG. 4 with folded tabs. The faceplate 110 includes at least two tabs 116 formed on its periphery, the two tabs 116 being diametrically opposed on the periphery of the faceplate 110. Each tab 116 includes an opening 118. The faceplate 110, when manufactured, may be flat as shown on FIG. 4. The tabs 116 are folded as shown on FIG. 5 for placement over the sleeve 120, for assembling the modular grid 100 and for mounting the modular grid 100 on a conduit.

Figure 6:
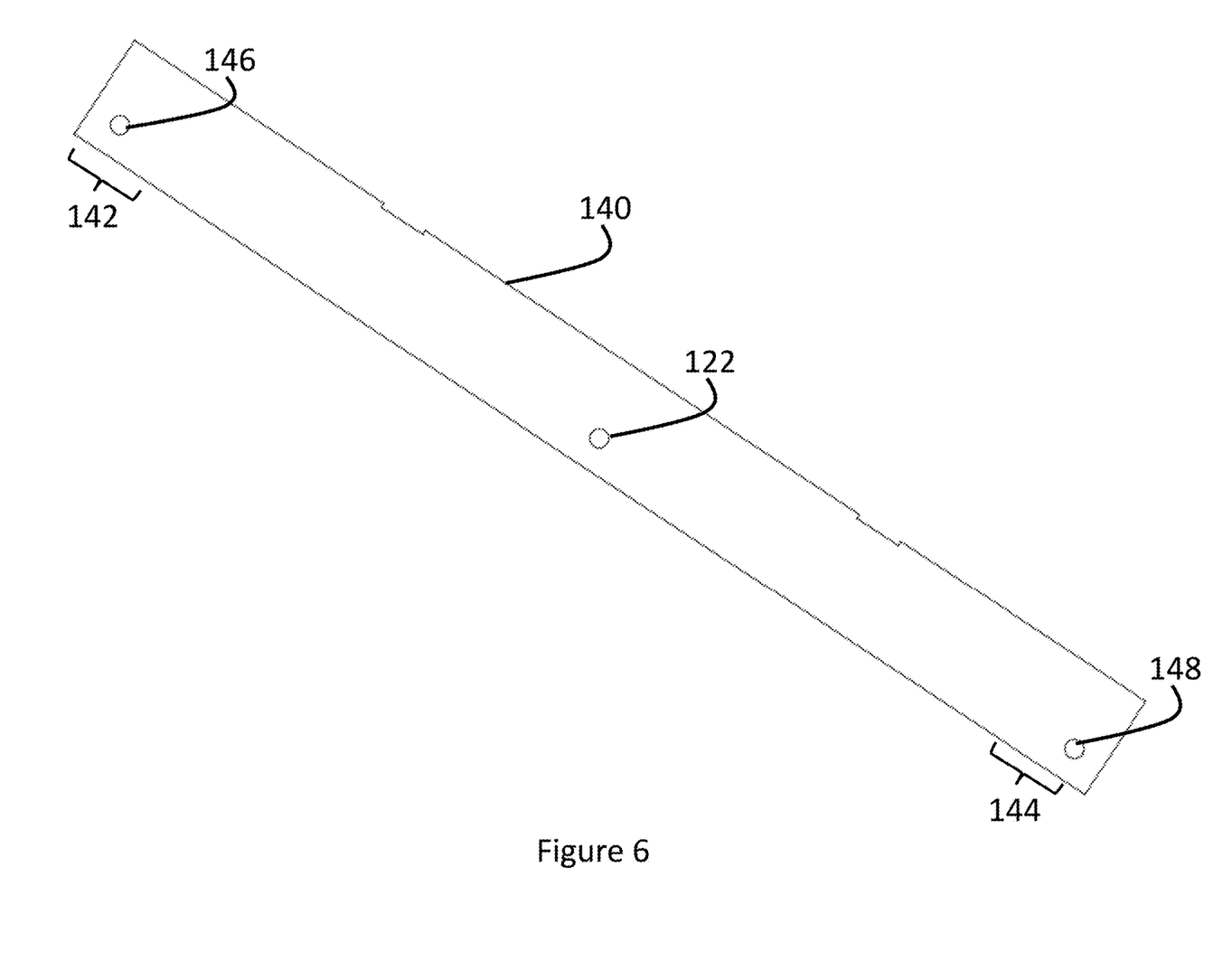
FIG. 6 is a top plan view of a strip for forming a sleeve of the modular grid of FIG. 1 in accordance with an embodiment of the present technology.
Figure 7:
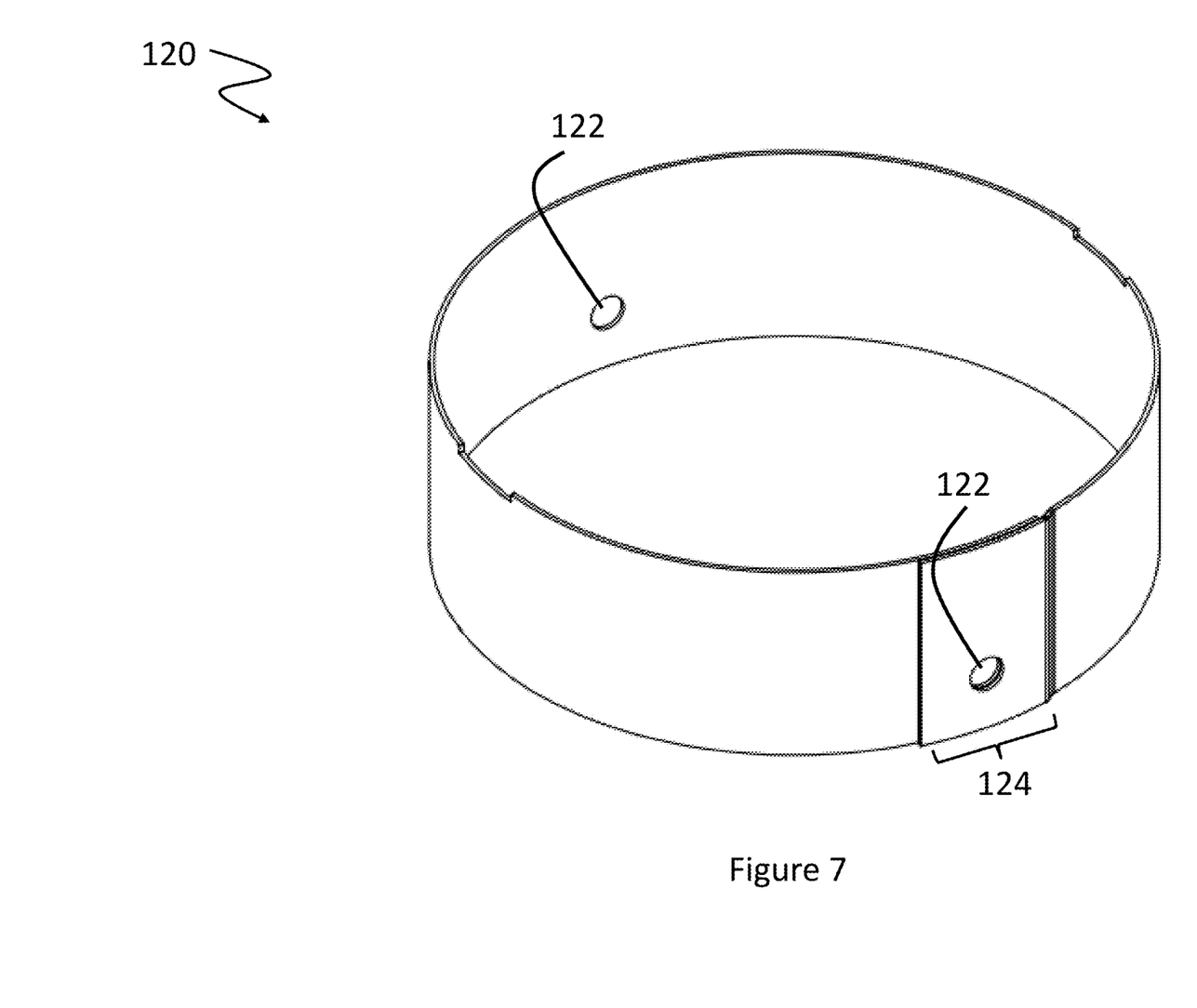
FIG. 7 is a perspective view taken from a front, right side of sleeve obtained by bending or folding the strip of FIG. 6 in accordance with an embodiment of the present technology.

FIG. 6 is a top plan view of a strip for forming a sleeve of the modular grid of FIG. 1. FIG. 7 is a perspective view taken from a front, right side of sleeve obtained by bending or folding the strip of FIG. 6. The sleeve 120, when assembled, has at least two openings 122 positioned for matching with the openings 118 of the faceplate 110. The sleeve 120 may be formed by bending or folding a rectangular strip 140. Opposite extremities 142 and 144 may be overlapped when the rectangular strip 140 is bent or folded to form the sleeve 120. Openings 146 and 148 in the extremities 142 and 144 also overlap to form one of the openings 122 within an overlapped section 124 of the sleeve 120. Another opening 122 of the rectangular strip 140 remains as the other opening 122 of the sleeve 120.

The attachments 130 are insertable into the openings 118 formed in the tabs 116 of the faceplate 110 when these openings 118 are aligned with the openings 122 formed on the perimeter of the sleeve 120. Upon positioning the modular grid 100 on the extremity of a conduit, the attachments 130 may thus be inserted through the openings 118 of the tabs 116, through the openings 122 of the sleeve 120 and through additional openings (not shown) formed at the extremity of the conduit. Various types of attachments 130 may be used within the scope of the present technology. For example and without limitation, the attachments 130 may comprise simple screws, bolts, or rivets. As shown for example on FIGS. 1, 2 and 3, the attachments 130 may comprise a combination of knobs or handles 132 with bolts 134, such attachments being usable for facilitating mounting of the modular grid 100 on a conduit.

Figure 8:
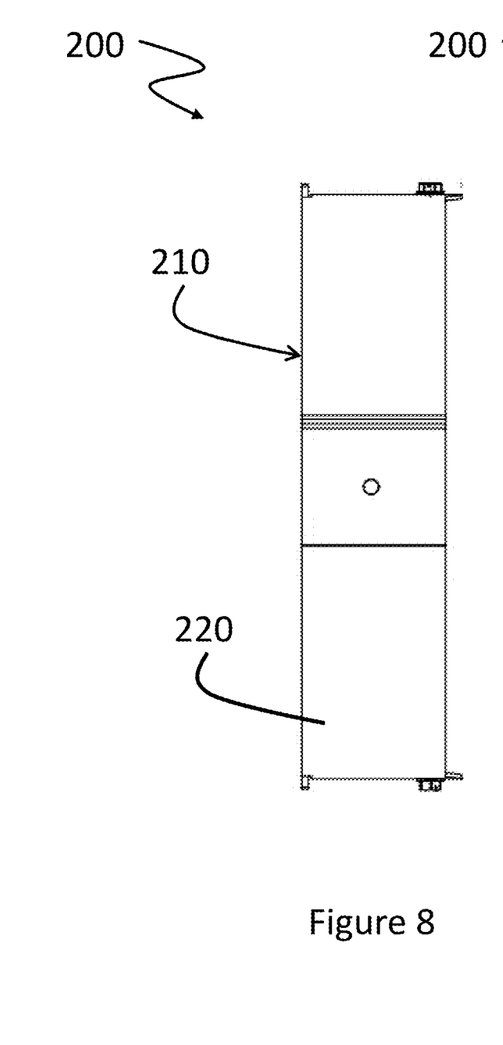
FIG. 8 is a right elevation view of a variant of the modular grid in accordance with another embodiment of the present technology.
Figure 9:
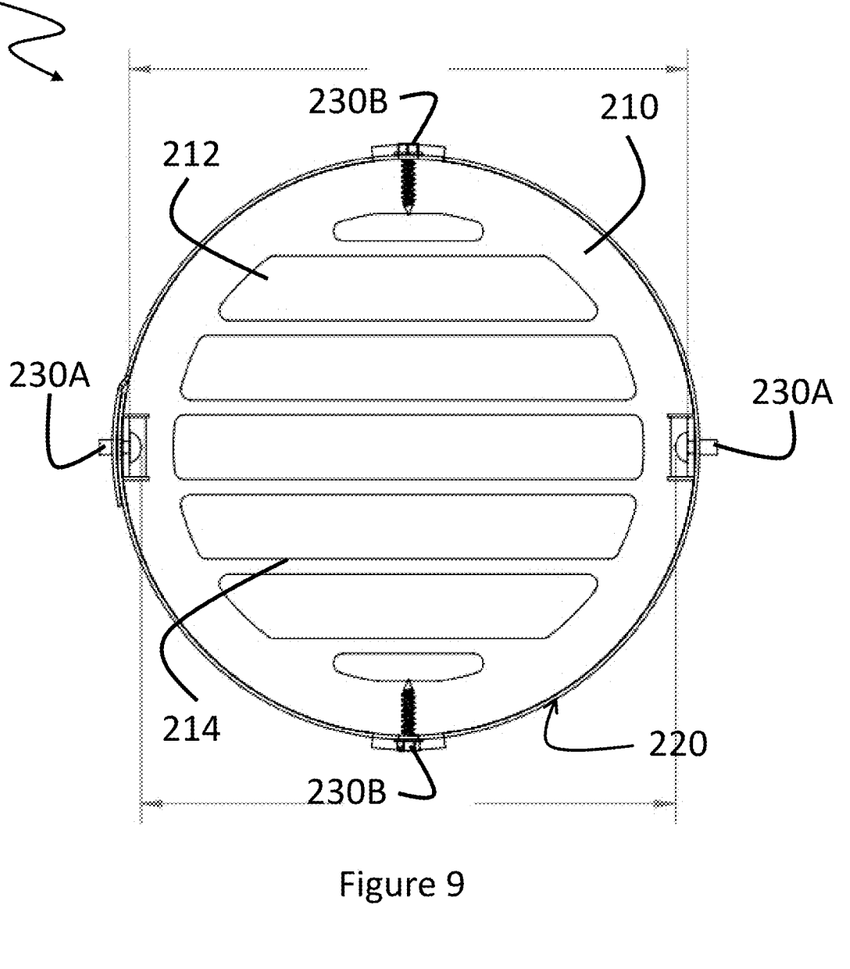
FIG. 9 is a rear elevation view of the variant of the modular grid show in in FIG. 8 in accordance with an embodiment of the present technology.

FIG. 8 is a right elevation view of a variant of the modular grid. FIG. 9 is a rear elevation view of the variant of the modular grid show in in FIG. 8. A modular grid 200 comprises a faceplate 210, a sleeve 220, and two pairs of attachments 230A and 230B. Openings 212 defined by bars 214 are horizontally oriented to illustrate a variant that may apply to the modular grid 100 of earlier Figures.

In this embodiment, the attachments 230A may first be used for assembling the faceplate 210 and the sleeve 220 in a first operation. The attachments 230B may then be used for mounting the modular grid 200 on a conduit, in a second operation, via additional openings (not shown) on the sleeve 220. In the non-limiting example of FIG. 9, the two attachments 230A are diametrically opposed along a first direction and the two attachments 230A are diametrically opposed along a second direction perpendicular to the first direction. The modular grid 200 may, in various embodiments, include some or all of the features and variants of the modular grid 100 as described hereinabove.

Figure 10:
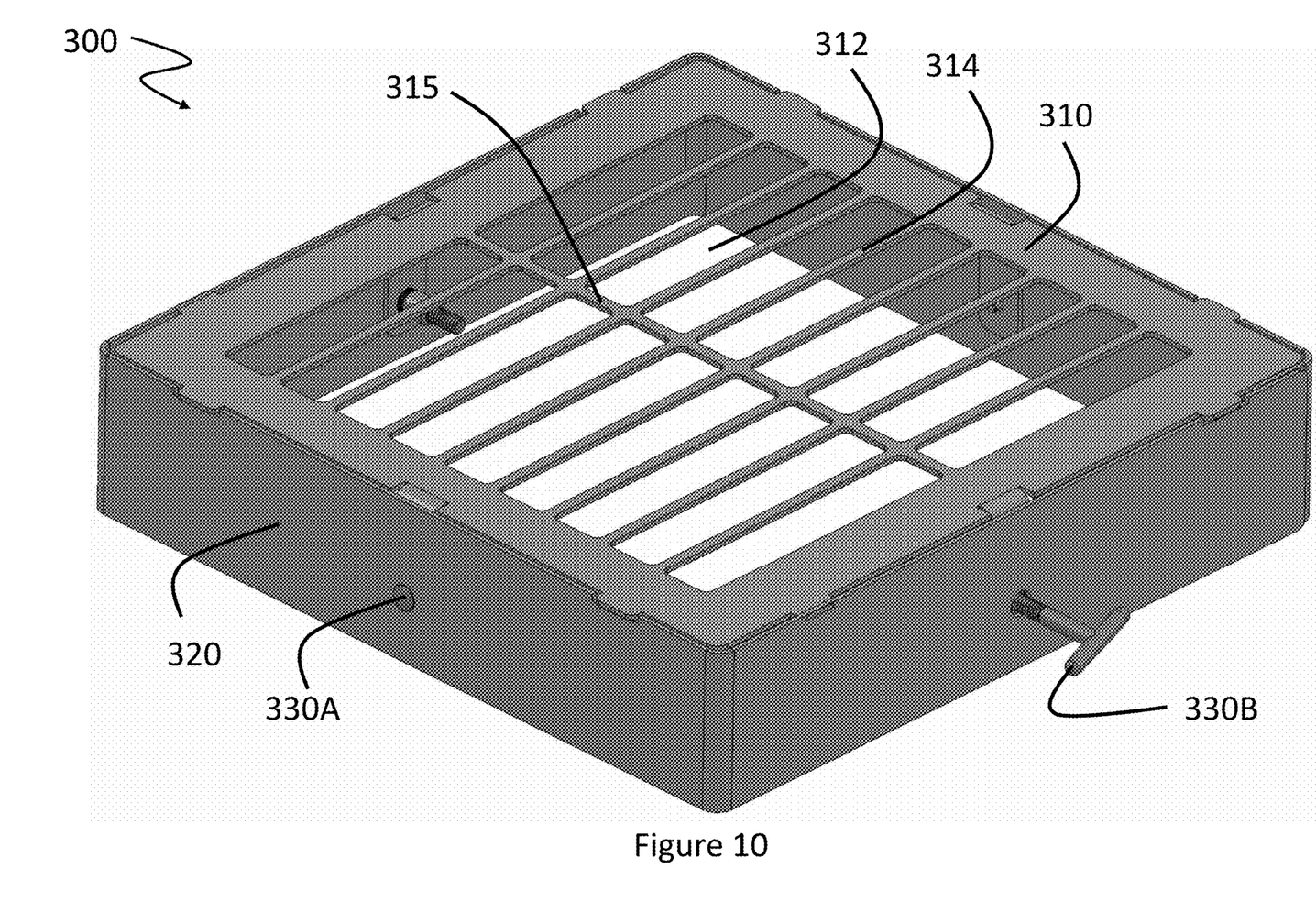
FIG. 10 is a perspective view taken from a front, right side of another modular grid in accordance with yet another embodiment of the present technology.
Figure 11:
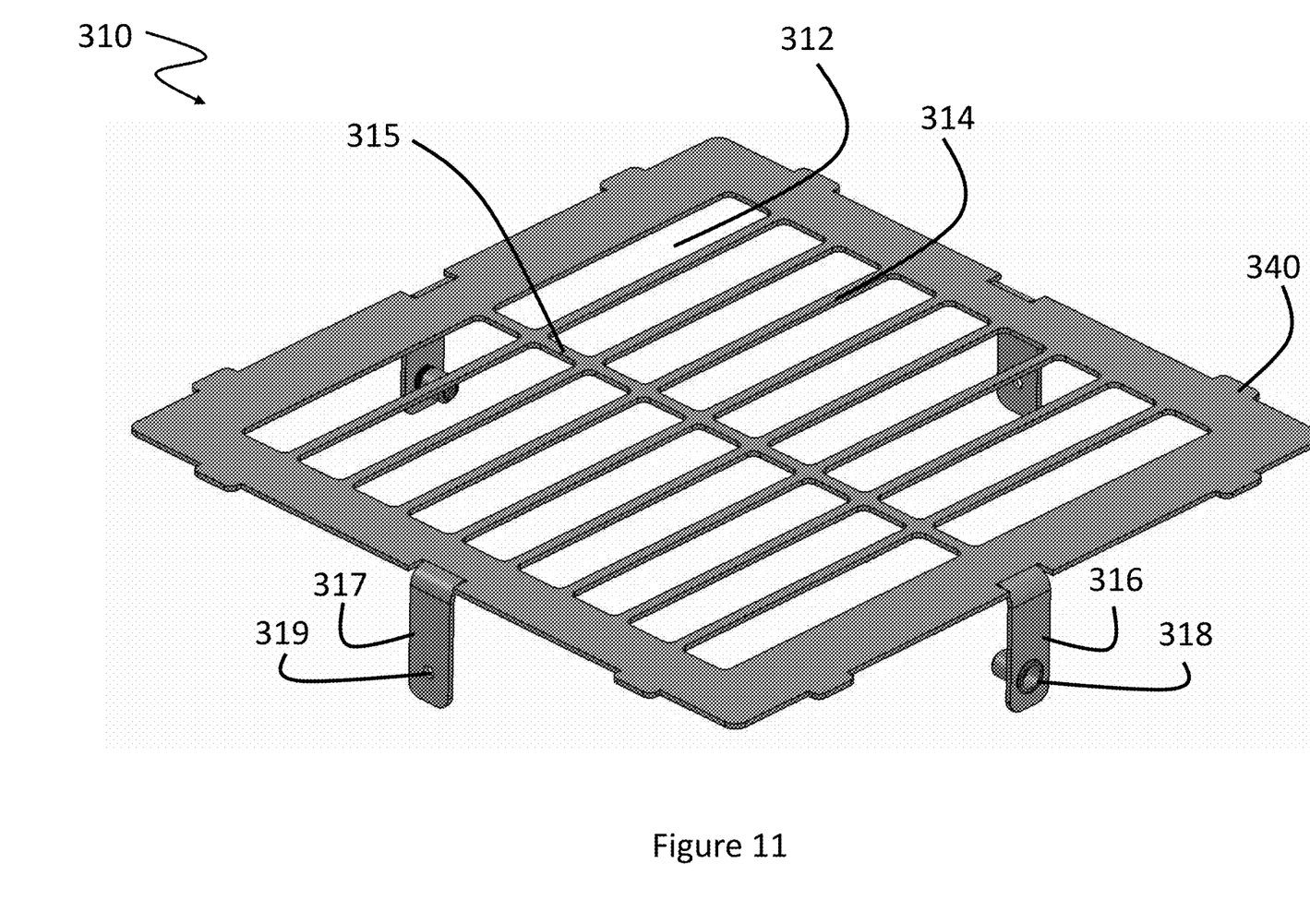
FIG. 11 is a perspective view taken from a front, right side of a faceplate of the modular grid of FIG. 10.
Figure 12:
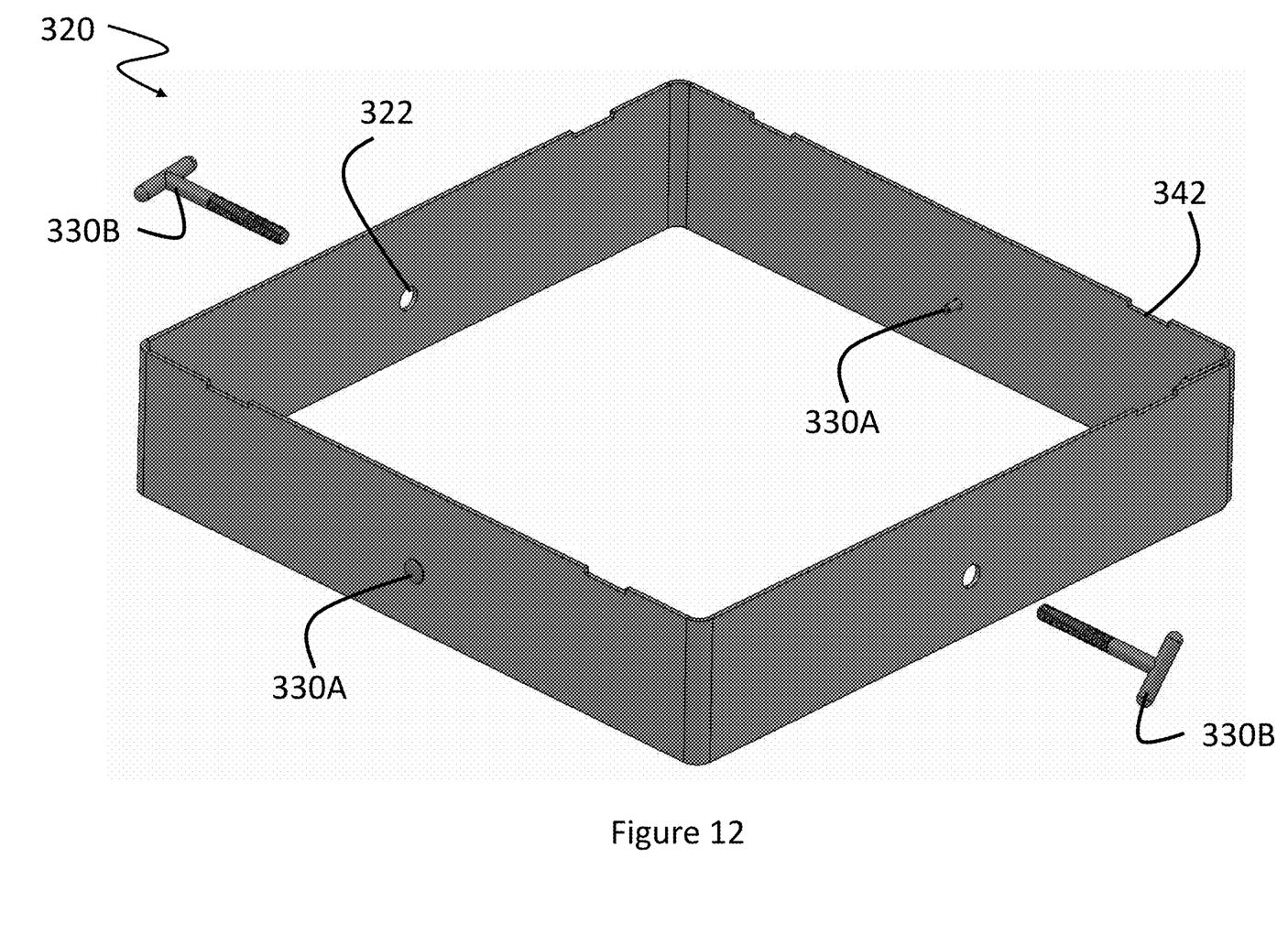
FIG. 12 is perspective view taken from a front, right side of a sleeve of the modular grid of FIG. 10.

FIG. 10 is a perspective view taken from a front, right side of another modular grid 300. FIG. 11 is a perspective view taken from a front, right side of a faceplate 310 of the modular grid 300. FIG. 12 is perspective view taken from a front, right side of a sleeve 320 of the modular grid 300. Referring to FIGS. 10-12, the modular grid 300 generally incorporates some or all features of the modular grids 100 and 200. In more details, the modular grid 300 comprises a faceplate 310 having a plurality of openings 312 defined between parallel bars 314 and a central bar 315, which is perpendicular to the parallel bars 314. The modular grid 300 also comprises a sleeve 320 abutting on the faceplate 310, and attachments 330A and 330B connecting the sleeve 320 to the faceplate 310. The two attachments 330B are further used to mount the modular grid 300 to a conduit (not shown).

The faceplate 310 includes two tabs 316 and two more tabs 317 formed on its periphery. The two tabs 316 are diametrically opposed along a first direction on the periphery of the faceplate 310 and the two tabs 317 are diametrically opposed along a second direction perpendicular to the first direction on the periphery of the faceplate 310. Each tab 316 includes an opening 318 and each tab 317 includes an opening 319. The faceplate 310 may be substantially flat when manufactured. The tabs 316 and 317 are folded as shown on FIG. 11 for placement over the sleeve 320, for assembling the modular grid 300 and for mounting the modular grid 300 on a conduit.

The sleeve 320 has at least two openings 322 positioned for matching with the openings 318 of the faceplate 310 and two more openings (not shown) 322 positioned for matching with the openings 319 of the faceplate 310.

The attachments 330A are insertable into the openings 319 formed in the tabs 317 of the faceplate 310 when these openings 319 are aligned with the corresponding openings formed on the perimeter of the sleeve 320.

The attachments 330A may first be used for assembling the faceplate 310 and the sleeve 320 in a first operation. The attachments 330B may then be used for mounting the modular grid 300 on a conduit, in a second operation, via the openings 322 on the sleeve 320.

The faceplate 310 includes one or more locating tabs 340 (8 locating tabs are shown) and the sleeve 320 includes a corresponding number of locating recesses 342. The locating tabs 340 and the locating recesses 342 facilitate the alignment of the faceplate 310 on the sleeve 320 when assembling the modular grid 300.

The modular grid 300 as illustrated on FIGS. 10-12 has a square perimeter and rotating respective positions of the faceplate 310 and of the sleeve 320 by 90, 180 or 270 degrees can be contemplated. The modular grid 300 may have various perimeters that may not allow changes of their respective positions.

The modular grids 100, 200 and 300, and their variants, may be used in various applications, for example being mounted at the end of wastewater conduits, sewage conduits, ventilation conduits, and the like. The modular grids 100, 200 and 300 may be mounted on inlet or outlet sides of such conduits. The modular grids 100, 200 and 300 may be constructed in various sizes depending on the application, and the present technology does not define any predetermined size limit for the modular grids 100, 200 and 300.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A modular grid, comprising:
    a faceplate having at least one front opening and at least two tabs on its periphery;
    a sleeve configured to abut on the faceplate; and
    at least two attachments, each attachment being configured for insertion into an opening formed in a corresponding one of the at least two tabs and into a corresponding opening formed on the perimeter of the sleeve,
    the sleeve being formed by bending or folding a rectangular strip,
    the sleeve comprising an extremity of the rectangular strip overlapping over an opposite extremity of the rectangular strip.

2. The modular grid of claim 1, wherein the sleeve is an outer sleeve adapted for mounting on an outer face of an extremity of a conduit.

3. The modular grid of claim 2, wherein each attachment is configured for insertion in a corresponding opening formed on the extremity of the conduit.

4. The modular grid of claim 1, wherein the sleeve is an inner sleeve adapted for mounting on an inner face of an extremity of a conduit.

5. The modular grid of claim 4, wherein each attachment is configured for insertion in a corresponding opening formed on the extremity of the conduit.

6. The modular grid of claim 1, wherein the perimeter of the faceplate is selected from a circle, an oval, a square, a rectangle, a triangle, a pentagon, an hexagon, and an octagon.

7. The modular grid of claim 1, wherein the faceplate comprises a plurality of front openings.

8. The modular grid of claim 7, wherein the front openings collectively extend over a major portion of an area defined by the perimeter of the faceplate.

9. The modular grid of claim 7, wherein the front openings form a plurality of parallel slots.

10. The modular grid of claim 7, wherein the front openings form a rectangular grid.

11. The modular grid of claim 1, wherein the faceplate is made of a material selected from galvanized steel, stainless steel, aluminum, and polymer.

12. The modular grid of claim 1, wherein the sleeve is made of a material selected from galvanized steel, stainless steel, aluminum, and polymer.

13. The modular grid of claim 1, wherein one of the openings on the perimeter of the sleeve is formed in the extremities of the rectangular strip.

14. The modular grid of claim 1, wherein the faceplate has a first perimeter and the sleeve has a second perimeter configured for matching the first perimeter of the faceplate.

15. The modular grid of claim 1, wherein the at least two tabs comprises two tabs being diametrically opposed on the periphery of the faceplate.

16. The modular grid of claim 1, wherein each of the at least two tabs is foldable for placement over the sleeve when assembling the modular grid.

17. The modular grid of claim 1, wherein the attachments are selected from screws, bolts and rivets.

18. The modular grid of claim 1, wherein each of the attachments comprises a knob or a handle connected to a bolt.

* * * * *